United States Patent
Ashtaputre et al.

(10) Patent No.: US 10,735,217 B2
(45) Date of Patent: Aug. 4, 2020

(54) DISTRIBUTED INTERNET ACCESS IN AN OVERLAY FABRIC USING COMBINED LOCAL AND REMOTE EXTRANET POLICIES

(71) Applicant: Cisco Technology, Inc., San Jose, CA (US)

(72) Inventors: Vrushali Ashtaputre, San Jose, CA (US); Abiose Gbolahan Ibigbami, Kanata (CA); Johnson Leong, Sunnyvale, CA (US); Marc Portoles Comeras, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/368,006

(22) Filed: Mar. 28, 2019

(65) Prior Publication Data

US 2020/0162282 A1    May 21, 2020

Related U.S. Application Data

(60) Provisional application No. 62/770,345, filed on Nov. 21, 2018.

(51) Int. Cl.
*H04L 12/28* (2006.01)
*H04L 12/707* (2013.01)
(Continued)

(52) U.S. Cl.
CPC ...... *H04L 12/2858* (2013.01); *H04L 12/4641* (2013.01); *H04L 45/22* (2013.01); *H04L 12/4679* (2013.01); *H04L 41/0803* (2013.01)

(58) Field of Classification Search
CPC ............. H04L 12/2858; H04L 12/4641; H04L 12/4675–4679; H04L 41/08–0803; H04L 45/22
See application file for complete search history.

(56) References Cited

U.S. PATENT DOCUMENTS 9,049,115 B2    6/2015  Rajendran et al.
2010/0329252 A1*  12/2010  Mulamalla ............... H04L 12/18
                                                    370/390
(Continued)

OTHER PUBLICATIONS

"Cisco Virtual Topology System: Data Center Automation for Next-Generation Cloud Architectures White Paper," available at www.cisco.com, Apr. 26, 2017, pp. 1-13.
(Continued)

*Primary Examiner* — Eric Myers
(74) *Attorney, Agent, or Firm* — Polsinelli PC

(57) ABSTRACT

The present technology provides a system, method, and computer-readable medium directed to dynamic implementation and management of multi-provider internet access featuring multiple access points across a multi-site overlay network fabric. An aspect of the technology is directed to the implementation of a common fabric-wide Virtual Network (VN) with a unique Internet Instance Identifier (Internet IID) that is dedicated to internet access traffic. Default access routes from multiple service providers (SP) are leaked into the VN with the Internet IID at exit points of the fabric using local Extranet policies. Internet-bound traffic generated from any point within the overlay fabric network is then redirected into the Internet IID, using remote Extranet policies. Internet-bound traffic, once in the Internet IID, follows the SP default access route(s) towards the exit points where SP specific access policies may be applied to the traffic which is then forwarded to the corresponding SP network.

20 Claims, 11 Drawing Sheets

(51) Int. Cl.
*H04L 12/46* (2006.01)
*H04L 12/24* (2006.01)

(56) References Cited

U.S. PATENT DOCUMENTS

2015/0163323 A1* 6/2015 Moreno .............. H04L 12/4675
709/201
2016/0330074 A1 11/2016 Cook et al.
2018/0367328 A1* 12/2018 Hooda ................ H04L 61/2069

OTHER PUBLICATIONS

Doyle, Lee, "Virtual overlay networks: Tunneling protocols enable multi-tenancy," Jul. 2013, 3 pages.
"Netfoundry's Cloud-Native Global Network Control Fabric," Netfoundry, available at netfoundry.oi, p. accessed on Dec. 19, 2018, 5 pages.

* cited by examiner

DISTRIBUTED INTERNET ACCESS IN AN OVERLAY FABRIC USING COMBINED LOCAL AND REMOTE EXTRANET POLICIES

CROSS-REFERENCE TO RELATED APPLICATION

This application is related to and claims priority under 35 U.S.C. § 119(e) from U.S. patent application Ser. No. 62/770,345, filed Nov. 21, 2018, entitled "DISTRIBUTED INTERNET ACCESS IN AN OVERLAY FABRIC USING COMBINED LOCAL AND REMOTE EXTRANET POLICIES," the entire contents of each of which is incorporated herein by reference for all purposes.

TECHNICAL FIELD

The present technology pertains to a system and method for providing internet access in intent-based networks. More specifically, it is directed to dynamic provisioning and management of multi-provider internet access in a multi-site overlay network fabric.

BACKGROUND

The provisioning and management of internet access in networking, and driving service provider use with networking policies are recurring challenges. These challenges are further exacerbated when internet access is provided across multiple service providers with a varied number of policies to drive the use of each service provider,

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
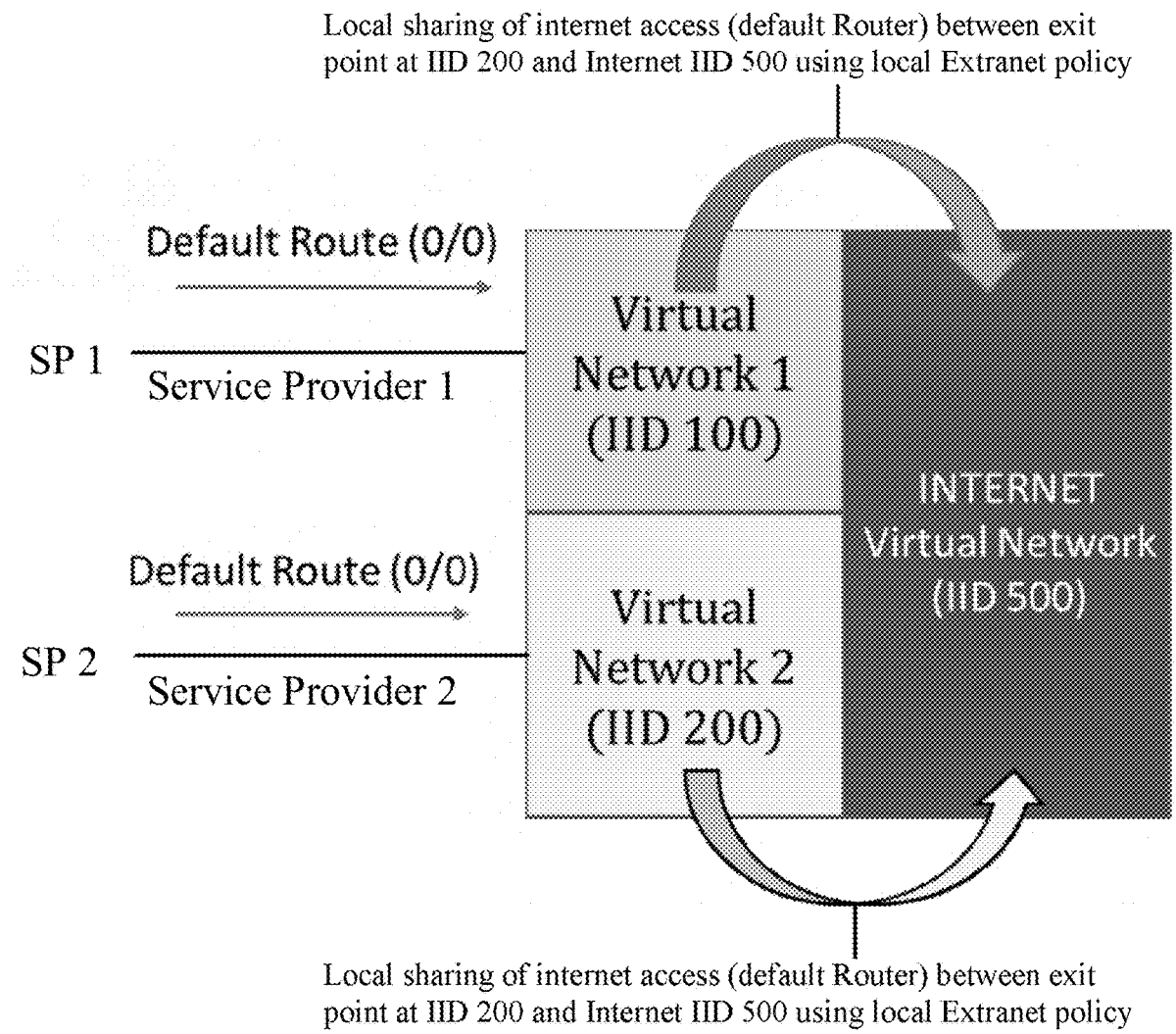
FIG. 1 illustrates a block diagram to represent the local leaking of internet routes into an isolated Virtual Network dedicated to internet access, in accordance with some embodiments of the present technology.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

OVERVIEW

Disclosed are systems, methods, and computer-readable media for dynamic provisioning and management of isolated Internet access with multiple Service Providers in a multi-site Software-Defined Access network using a common internet Virtual Network dedicated for internet access and a combination of Software-Defined Access local and remote Extranet policy features.

In one aspect of the present technology, a method includes creating an isolated Internet Virtual Network (VN) in the overlay fabric network, wherein the isolated Internet VN spans across plurality of domains in the overlay fabric; the method further includes leaking into the isolated Internet VN at least one default access route to at least one Service Provider, using one or more local extranet policies and redirecting at least one traffic flow destined for the at least one Service Provider into the Internet VN in the overlay fabric, using one or more remote extranet policies.

DETAILED DESCRIPTION

In an overlay network fabric (such as Software-Defined Access Network), Internet access may be provided by multiple service providers with a varied number of policies to drive the use of each service provider. An effective overlay network architecture may be able to support isolated access to each service provider via multiple exit/entrance points across multiple fabric site/domains. Additionally, an effective overlay network architecture may accommodate changing of internet access policies and the addition/removal of service providers at any point in time in a dynamic manner. The ability to seamlessly combine internet access provisioning with networking policies for moderating internet access in accordance to one or more Service Provider (SP) use policies is a recurring problem in networking. Some embodiments of the present technology provide an innovative solution to the service provider access problem, tailored for networks with a Software-Defined Access layer, by combining remote and local extranets together with a centralized control-plane to facilitate the decoupling of internet traffic identification from the routing policy application. In this way, internet access may change as the network administrators deem necessary. The advantages of the proposed solution, provided in accordance with some embodiments of the present technology, are simplicity, adaptability, and stability in providing on demand and/or pre-provisioned access to a multitude of Service Providers from within an overlay fabric.

Some embodiments of the present technology build on an observation that a problem of providing effective Internet access and implementing Internet access policies in, for example, a campus network, may be divided into two main aspects; namely the identification (classification) of Internet traffic and the implementation of routing (applying policies) to designated service provider(s). Aspects of the present technology describe a versatile fabric overlay architecture to enable aspects of the aforementioned problem to be tackled by independent pieces of the architecture. One advantage of this approach is that it simplifies the problem and results in a system that is highly adaptable to changes and supports complex service provider policies.

Virtual Networks (VNs) may be used for providing segmentation, isolation, and security among network elements. A network controller, in an overlay network comprising of one or more Virtual Networks, may bind each Virtual Network to an Instance Identifier (IID). Virtual Network Instances (identified by an assigned Instance ID) may then be used to implement traffic flow segmentation across the overlay network. In such a scenario learned routes are kept within the same IID or Virtual Network and are not shared across IIDs or Virtual Networks. However, by utilizing the Extranet feature as defined in the context of Software-Defined Access, a network operator may specify policies that allow hosts and resources residing in one Virtual Network (IID) domain to communicate with hosts in a separate Virtual Network. This may be achieved, for example, by specifying local extranet policies between locally connected Virtual Networks to allow sharing of routes among locally connected Virtual Networks (attached to the same Border Router). Similarly, remote extranet policies allow for information exchange to take place between remote Virtual Networks.

Some aspects of the present technology exploit the concept of extranets, as defined in the context of a Software-Defined Access network, in order to effectively implement internet traffic identification and flexibly apply internet access policies (routing) in a dynamic manner. For example, application of remote extranet policies enables a traffic flow associated with a. (source) Virtual Network (VN) to be encapsulated with information. associated with a remote (destination) VN (i.e., remote Virtual Network Instance ID). The traffic flow may then be forwarded across Virtual Network boundaries to the destination VN. Additionally, Extranet policies may be applied locally (Local extranet policy), to enable sharing/copying of routes between the routing tables of different locally connected Virtual Networks. Accordingly, local extranet policies allow for the sharing of routes among locally connected Virtual Networks (attached to the same Border Router) while remote extranet policies allow communication between remote Virtual Networks.

Some embodiments of the present technology introduce a concept of a common Internet Virtual Network in the overlay fabric that may span across a fabric system comprising of multiple independent fabric sites/domains. Internet-bound traffic is then identified and redirected into the Internet Virtual Network by one or more fabric controllers. Service Provider access policies are applied to the Internet-bound traffic in the Internet Virtual Network.

Control plane elements of an overlay fabric may identify a traffic flow as being destined for the Internet (i.e., external service provider). Upon identifying a traffic flow as destined for an external (internet) destination, a control plane element may provide a route that places the traffic in the Internet Virtual Network which is isolated from other Virtual Networks (and their policies) in the overlay fabric. This may be achieved by exploiting remote extranets feature of Software-Defined Access layer. The classification policy is performed regardless of the access policy of a particular Service Provider.

The isolation of the Internet-bound traffic associated with a specific Service Provider may be achieved, at the exit points of the fabric by one or more fabric exit routers using local Extranet policies. Therefore there is no need to manipulate the control plane or fabric ingress elements to provide service isolation. Isolating the Internet-bound traffic within the internet Virtual Network, as prescribed by some embodiments of the present technology, allows for addition/removal of new/existing Service Provider in a dynamic manner (as it only affects the routing provisioning within the Internet Virtual Network.)

The Internet Virtual Network identified by an Internet Instance Identifier (internet IID) is dedicated (system-wide) to internet access traffic across multiple sites/ domains. The internet IID learns routes through local leaking of Service Provider routes which happens at fabric-edge/border routers that act as Exit Points to the Internet. The rest of the network learns routes in the Internet IID as a default path towards exit points. Consequently, the Internet access problem reduces to insertion of traffic (using Extranet feature of Software-Defined Access overlay) into the Internet IID anywhere in the fabric and allowing the routes to flow through the Internet Virtual Network (Internet IID) towards the exit points. The Internet access policies (i.e., preferred Service Provider) may then be introduced locally at the exit points and propagated by an overly control protocol in accordance to one or more internet policy parameters (i.e., priorities/weights). An illustration of an Internet Instance ID for distributing internet prefixes as default routes across the fabric, in accordance with some embodiments of the present technology, is provided in FIG. 1. The presented configuration allows for local leaking of default internet access routes from Virtual Networks locally connected to one or more Service Provider into the Internet Virtual network which spans across the fabric system (including multiple fabric sites/domains). For example, with reference to FIG. 1, Virtual Network 1 and 2 identified, respectively, with Instance IDs 100 and 200, can leak default internet access routes (made available through their locally connected Service Providers) into the Internet Virtual Network with an Internet Instance ID 500. Internet access traffic is inserted into Internet Instance ID 500 which distributes the default internet access prefixes (typically the default route 0/0) across the fabric system. This allows the Internet Virtual Network (Internet IID 500) to dynamically advertise multiple Service Providers in the system following administrator preferences.

Figure 2:
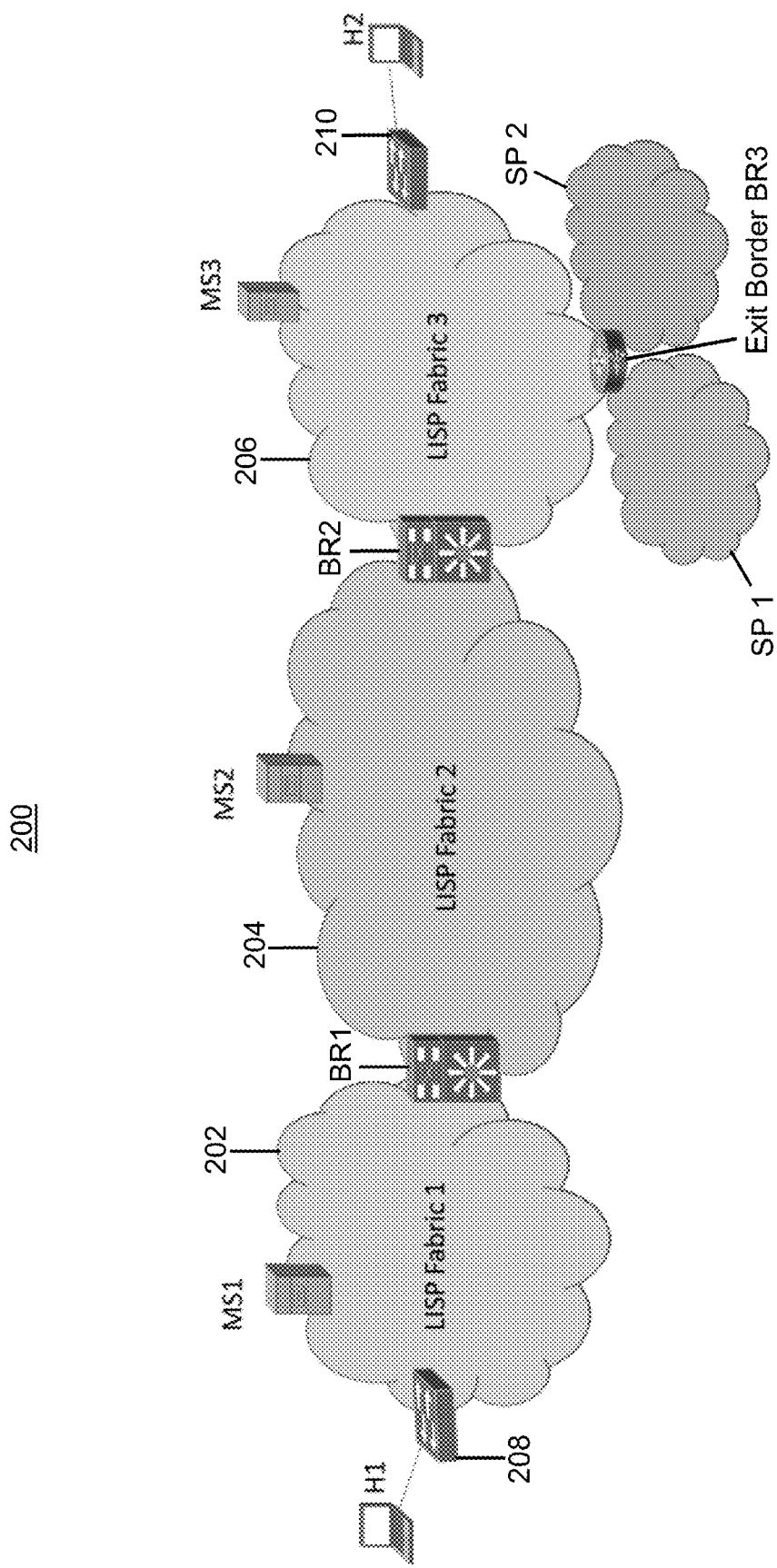
FIG. 2 illustrates a reference topology with multi-site internet access with elements directed to provisioning and publishing of Internet access policy, in accordance with some embodiments of the present technology.

FIG. 2 illustrates an example reference topology 200 featuring a Software-Defined Access Layer and Multi-Site Internet Access functionality. The reference topology 200 utilizes an overlay control protocol based on Locator/Identifier Separation Protocol (LISP). LISP is a network architecture and protocol which assigns two addresses for each network node: one for its identity referred to as Endpoint identifier (EID) which is assigned to the end host, and another for its location in the network, referred to as Routing Locator (RLOC), assigned to devices (i.e., routers) that make up the global routing system. As such, LISP addresses are respectively known as Endpoint Identifiers (EIDs) and the Routing Locators (RLOCs). Each node on the network has one Endpoint Identifier but may have multiple and variable Routing Locators. The fabric overlay control protocol provides a mapping service between the EID and RLOC.

The reference topology 200 in FIG. 2 consists of three LISP-based fabric sites 202, 204 and 206. The EID to RLOC mapping for the fabric sites is provided by fabric controllers/Map Servers MS1, MS2, and MS3, respectively. The reference fabric topology 200 further comprises a Fabric Border Router BR1 that connect fabric sites 202 and 204, a Fabric Border Router BR2 that connects fabric sites 204 and 206, and Fabric Edge routers 208 and 210. The Edge routers 208 and 210 may serve as access-layer switches for connecting wired devices, namely H1 and to H2 to fabric sites 202 and 206, respectively. Fabric controllers or Map servers (MS) run a host tracking database to map location information (i.e., Endpoint IDs), to a Routing location (i.e., RLOC). Accordingly, Fabric controllers service resolution request from the edge and border routers to locate destination Endpoint IDs.

In order to channel the Internet-bound traffic into an isolated segment that directs all the traffic placed in it towards fabric exit points to one or more Service Provider networks, an Internet Virtual Network with a designated Internet IID that spans across the entire fabric system is first provisioned in the fabric. With reference to fabric topology 200, the exit border router BR3, connected to Service Provider 1 (SP1) and Service Provider 2 (SP2), programs the default route offered by the service providers into the Internet Virtual Network with Internet IID 10000 using local extranet policies. Exit Border Router BR3 registers the default Internet access in the Internet IID 10000 with the local fabric Controller MS3 in order to draw all traffic in the Internet VN towards the exit point. Exit Border Router BR3 only leaks/registers an internet default route (i.e., 0/0) into Internet VN (Internet IID 10000) and with the Fabric controller MS3. BR3 does not expose a service provider prefix (i.e., SP1 or SP2) anywhere in the fabric during the provisioning of the internet VN. Since Exit Border Router BR3 has two providers of internet access locally connected to it, it may use Priority/Weight features to set the SP policy (i.e., SP1 may be set as default to give it a better priority).

A next step may include provisioning or publishing of the internet access policy in the fabric. The local Fabric controller (Map Server) MS3 associated with fabric site 206 publishes the internet access policy (namely default internet route through the Exit Border router BR3) to the Software-Defined Access based fabrics. In a multi-site deployment, fabric controllers may be provisioned to respond to Internet access routing requests with a default route in the Internet Virtual Network pointing towards the fabric borders. Fabric Border router BR2 learns of the registered default route to the internet (leaked into the Internet IID 10000 by BR3) from the local Fabric Controller MS3 and propagates the registration of Internet Access in the Internet Virtual Network (Internet HD 10000) to the transit sites in a multi-site setting. Depending on the multi-site mode, the internet access registration at Fabric Controller MS3 may make it across all sites to Fabric Controller MS1.

In accordance with some embodiments of the present technology, Internet access may also be cascaded across Fabric Border routers and controllers by utilizing subscription-based services. In this case, the Fabric Border routers register the Internet access with the local fabric controller and the fabric controller publishes it to the next fabric Border router hence propagating across all fabric controllers and Border routers across a Software-Define Access based fabric.

A local Extranet policy is applied at a fabric edge router (i.e. Edge Border Router MS3 in FIG. 2) in order to leak the Service Provide default route (i.e., to SP1 and SP2) into the Internet Virtual Network (i.e., Internet IID 10000) to thereby direct all Service Provider bound traffic into the internet Virtual Network. Once an internet access default route is provided in the Internet Virtual Network, border routers may simply route the traffic in the Internet Virtual Network either by soliciting routing into from the fabric controllers or through pre-provisioned paths (i.e., as published by the fabric controllers). Service provider Policies may be applied either at the last fabric Border router (i.e., BR2 in FIG. 2), or the exit point itself (i.e., Exit Border BR3 in FIG. 2.)

Figure 3:
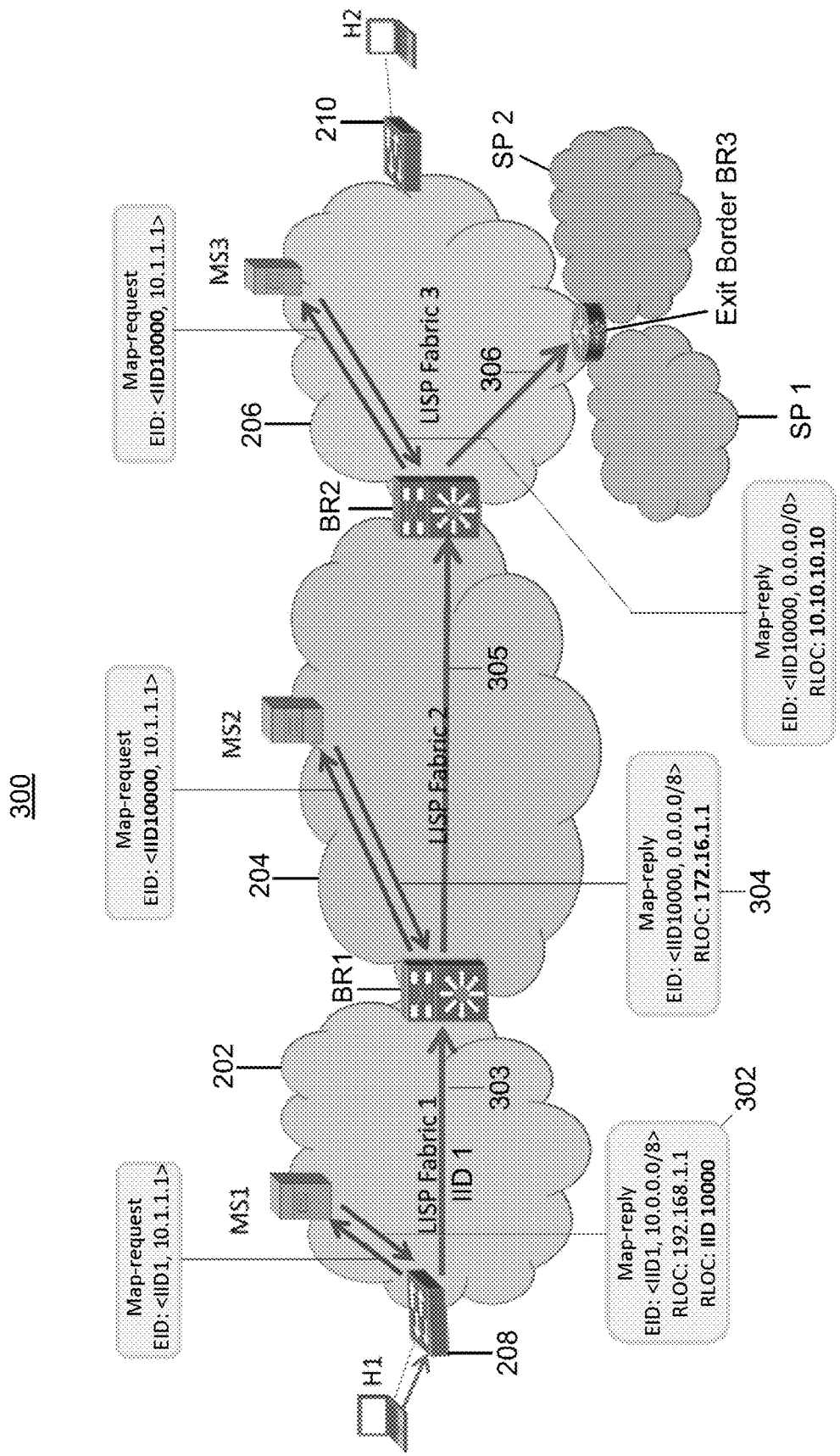
FIG. 3 illustrates a reference topology with multi-site internet access with elements directed to the redirection of Internet traffic into a common Virtual Network visible, in accordance with some embodiments of the present technology.

Once a default Internet access path is provided in the Internet HD, Internet-bound traffic generated from any point within the Software-Defined Access Network is redirected into the Internet ILI) and follows the default path towards the exit points. For example, with reference to the scenario provided in FIG. 3, H1 wants to access Internet services from the Virtual Network with HD 1. Accordingly, H1. makes a map request to the local fabric controller MS1 for the Service Provider (SP) prefix in IID 1. Fabric Controller MS1 identifies the destination as an internet address and applies a remote Extranet policy to the request. Fabric controller MS1 then sends back a map-reply with the Routing Locator (RLOC) of fabric Border router BRI (i.e., IP address 192.168.1.1 and the Internet IID 10000 as indicated by 302. This enables traffic from IID 1 to be leaked into Internet IID 10000. Edge Router 208 in IID 1 then encapsulates the traffic to the fabric border router BILI in the Internet IID 10000 (303). BR1 makes a map request to the next fabric controller MS2 for the Service Provider prefix in the internet IID 10000 itself Since the traffic is already in the Internet IID 10000 (which has a default route to the SP prefix) no extranet policy is applied at the fabric controller MS2 which sends back a map reply with the routing locator (RLOC) of the fabric border router BR2 in the Internet IID 10000 as indicated by 304. BRI then encapsulates the traffic to the fabric border router BR2 in the Internet IID 10000 (305). Upon receiving the incoming internet-bound traffic, BR2 makes a map request to the next (local) fabric controller MS3 for the Service Provider prefix in the Internet HD 10000 itself. Once again no extranet policy is applied at the controller since the traffic is already in the Internet HD 10000 (which has a default route to the SP prefix) and the controller sends back a map reply (306) with the routing locator (RLOC) of the exit border router BR3 in the Internet HD 10000. BR2 then encapsulates the traffic to the exit border router BR3 in the Internet HD 10000 (308). Upon receiving the Internet-bound traffic at BR3, which has direct default routes to both SP1 and. SP2, BR3 may then load balance the traffic across SP I and SP:2 or BR3 may prioritize one Service Provider over the other depending on the specified internet policy parameters (i.e., priorities and weights).

Figure 4:
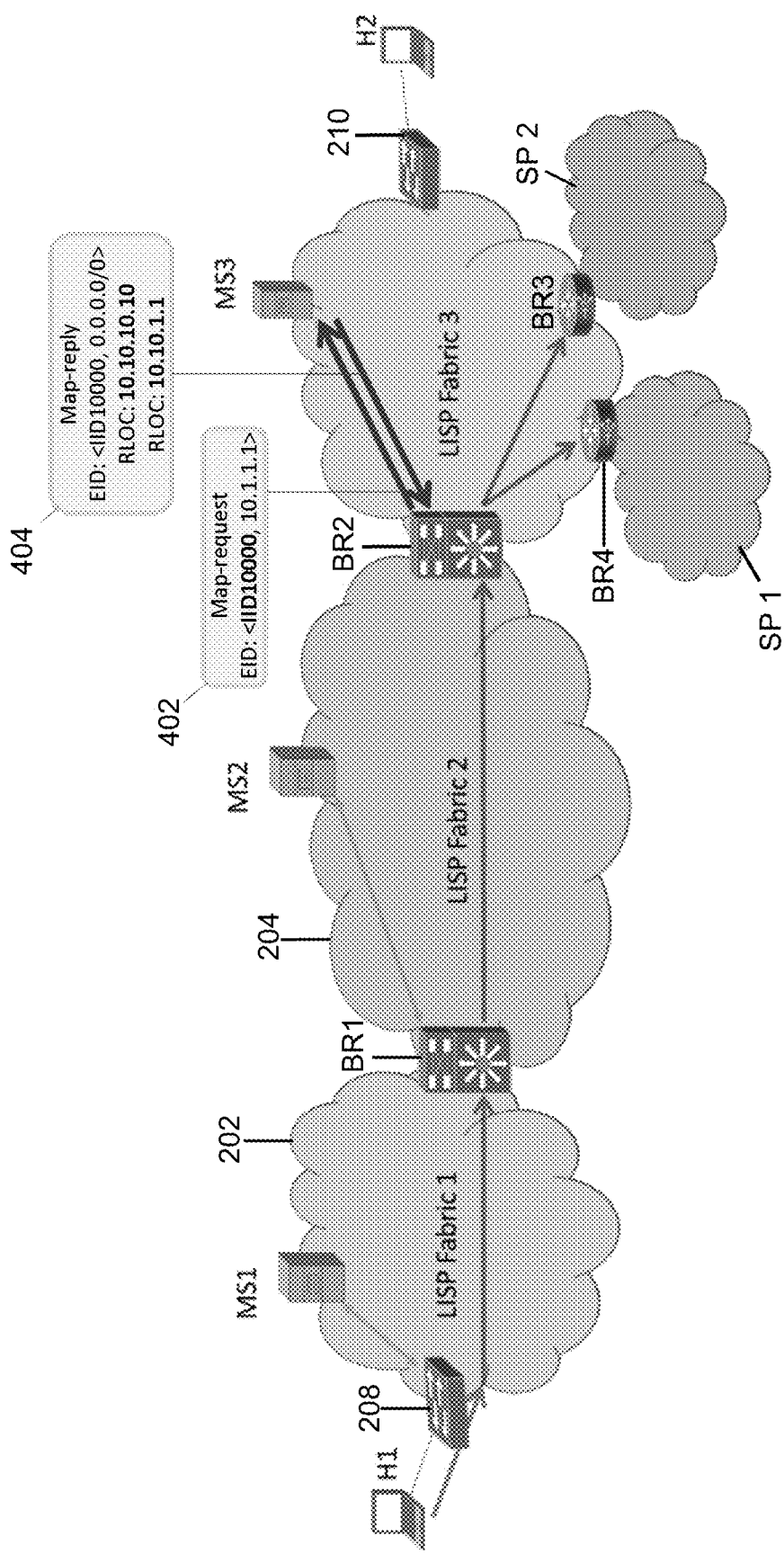
FIG. 4 illustrates a reference topology with multi-site internet access with elements directed to the application of Service Provider policy at fabric border exit point, in accordance with some embodiments of the present technology.

FIG. 4 illustrates a scenario wherein the Service Providers SP1 and SP2 are connected to two different Border Exit routers BR3 and BR4. The Border Exit routers BR3 and BR4 will leak their respective default internet routes (as provided by the corresponding Service Providers SP1 and SP2) into the Internet Virtual network. (i.e Internet IID 10000) and register their internet access with the local Fabric controller MS3. In this scenario, when Fabric Border router BR2 makes a map request (402) for an internet-bound Endpoint ID, the Fabric controller MS3 may send back a map reply with the routing locator (RLOC) of both exit border routers BR3 and BR4 in the Internet III) 10000, as indicated by 404.

As such the fabric controller MS3 can enforce the service provider policy at the fabric border router BR2 (i.e., cause the Fabric Border router to load balance the traffic across BR3 to SP2 and BR4 to SP1 or to prioritize one Service Provider over the other using, for example, LISP priorities and weights. The Service Provider (Internet) policy may also be applied at the Exit border router BR3 or BR4 if multiple Service Provider connections are available. in this scheme, internet traffic, generated from any point within the overlay fabric can continue to follow a default path until it is load balanced, based on the assigned priorities/weights, at the exit points of the fabric and transmitted towards the Service Provider(s) network.

In accordance with some embodiments of the present technology, dynamically adding a new service provider to the network may he accomplished simply by enabling the Exit Border router (peered or communicatively coupled to the new Service Provider) to leak the default internet route, corresponding to the new Service Provider, into the Internet IID (i.e., IID 10000) using local Extranet policies. The Exit Border Router then registers the new internet access route with its (local) fabric controller in the Internet IID 10000. The fabric controller will then push the internet-bound traffic to the newly added exit point in accordance with the priorities and weights used to define the Service Policy with respect to the new provider. The Exit Border router can then de-capsulate all the traffic in the Internet HD (i.e., HD 10000) and route it through the leaked default route into the Service Provider HD.

Some aspects of the present technology are directed to a multi-site deployment, wherein fabric controllers may be provisioned to respond to internet access routing requests with a default route in the Internet Virtual Network (Internet IID) pointing towards the fabric borders. In accordance with some embodiments of the present technology, Internet access may also he pre-provisioned across the fabric by utilizing subscription-based services. In this case, fabric border routers may register the Internet access with the local fabric controller which in turn may publish it to the next fabric border router hence propagating the route throughout the fabric. In this way, Internet access path(s) may be provisioned in fabric border routers and controllers across the entire Software-Defined Access fabric.

Pre-provisioning of the Internet access path(s) using subscription-based services contrasts with an on-demand request by fabric border routers made to fabric controllers for accessing Service Provider prefixes from within the fabric. In the subscription-based scheme, disclosed in accordance with some embodiments of the present technology, fabric border routers may subscribe to publications in the Internet Virtual network. This causes the fabric controllers to push the default router in the Internet Virtual Network to the fabric border routers. An example directed to the pre-provisioning of Internet path(s) using subscription-based services is provided in FIG. 5.

Figure 5:
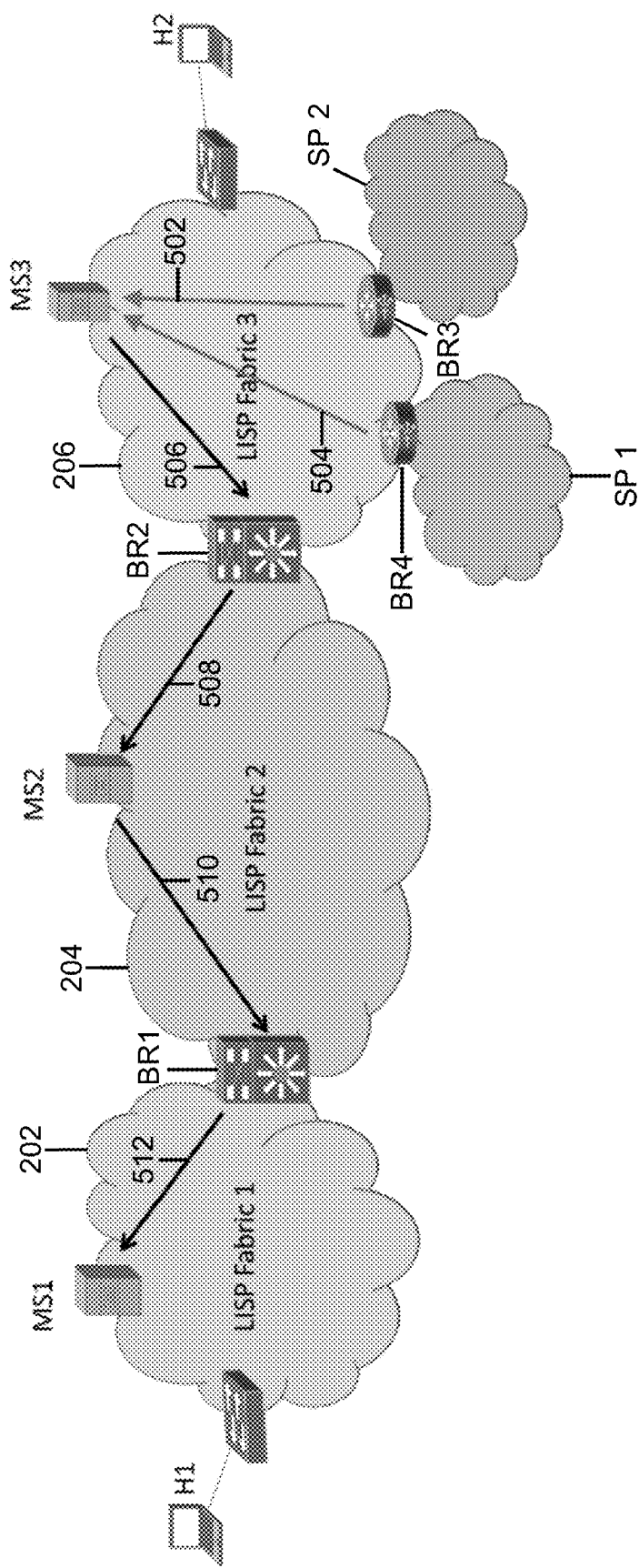
FIG. 5 illustrates a reference topology with multi-site internet access featuring a subscription-based pre-provisioned Internet path(s), in accordance with some embodiments of the present technology.

Turning now to FIG. 5, Service Providers SP1 provides its respective default access route to the Exit Border Routers BRA. Similarly, Service Provider SP2 provides its respective default access route to the Exit Border Routers BR3. Each Exit Border Router, upon learning of the default access route to its corresponding Service Provider, will leak the information, as a default route to the Internet, into the Internet Virtual Network (IID 10000). The Exit border routers BR3 and BR4 then register their Internet access paths with the corresponding local controller MS3, as respectively indicated by 502 and 504. The fabric controller MS3 then publishes the Internet access to its subscribed members (i.e., fabric border router BR2), as indicated by 506. Accordingly, the fabric border router BR2 introduces a default map-cache in its forwarding table. BR2 subsequently registers the Internet access with the corresponding fabric controller MS2 to draw traffic towards itself in the Internet Virtual Network. This is indicated by the reference arrow 508. The fabric controller MS2 publishes the Internet access to its subscribed members (i.e., fabric border router BRI), as indicated by 510. Accordingly, the fabric, border router BR1 introduces a default map-cache in its forwarding table. BR1 subsequently registers the Internet access with the corresponding fabric controller MS1 to draw traffic towards itself in the Internet Virtual Network. This is indicated by the reference arrow 512. in this way, internet access in the Internet Virtual Network cascades through the Software-Defined fabric overlays by registrations of the route by the fabric border routers with the corresponding fabric controllers and publication of the route by the fabric controllers to the subsequent fabric border routers. This ensures propagation of the default route throughout the fabric.

Figure 6:
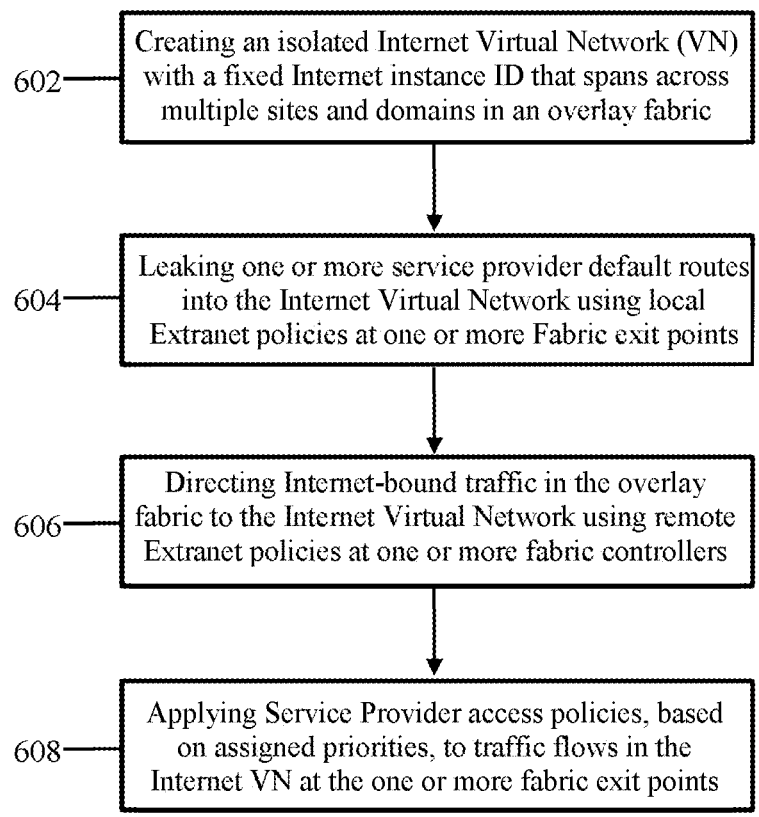
FIG. 6 illustrates a process flow for provisioning and management of isolated multi-site internet access in a multi-domain overlay network, in accordance with some embodiments of the present technology.

FIG. 6 provides an example process flow 600 for providing isolated internet access, in a. dynamic manner, via multiple Service Providers and at multiple points across a multi-site overlay fabric, in accordance with some embodiments of the present technology. With reference to the example process flow 600, at step 602 an overlay fabric control entity (i.e., overlay fabric controller) creates an isolated Internet Virtual Network (VN) with a fixed Internet instance ID that spans across multiple sites and domains in an overlay fabric. Subsequently, at step 604 one or more fabric exit border routers, with default routes to one or more Service Provider(s), leak the one or more service provider default routes into the Internet Virtual Network using local Extranet policies at one or more fabric exit points and register the said Internet access routes with the (local) fabric controller in the Internet Virtual Network. Once Service Provider default route(s) are made available in the Internet Virtual Network, the process moves to step 606 wherein Fabric controllers channel/direct the Internet-bound traffic in the overlay fabric to the Internet Virtual Network using remote Extranet policies. The traffic then follows the Service Provider (Internet) default route in the Internet VN towards one or more Fabric exit points.

Finally, at step 608, the fabric border router associated with a fabric exit point, or the exit border router itself decapsulates the traffic in the internee VN and applies Service Provider(s) access policies, based on the assigned priorities and weights, to the traffic flows to load balance the traffic; across the Service Providers or use a preferred provider.

Some embodiments of the present technology provide an innovative solution to the service provider access problem in a multi-site Software-Defined Access network when service providers can be introduced at any point in the fabric, and at any site or domain, and multiple providers can co-exist with their own access policies at one or more exit border routers in the SDA fabric. A solution, as described by some embodiments of the present technology, uses a combination of local and remote extranet policies that may be orchestrated from a centralized management point. Some advantages of this solution are simplicity, adaptability, and stability when providing an on demand-access to a multitude of Service Providers from within the overlay fabric.

In accordance with some embodiments, the present technology may be implemented in the context of a Cisco's Digital Network Architecture Center (DNA-C) which is a foundational controller and analytics platform for an intent-based enterprise network.

Figure 7:
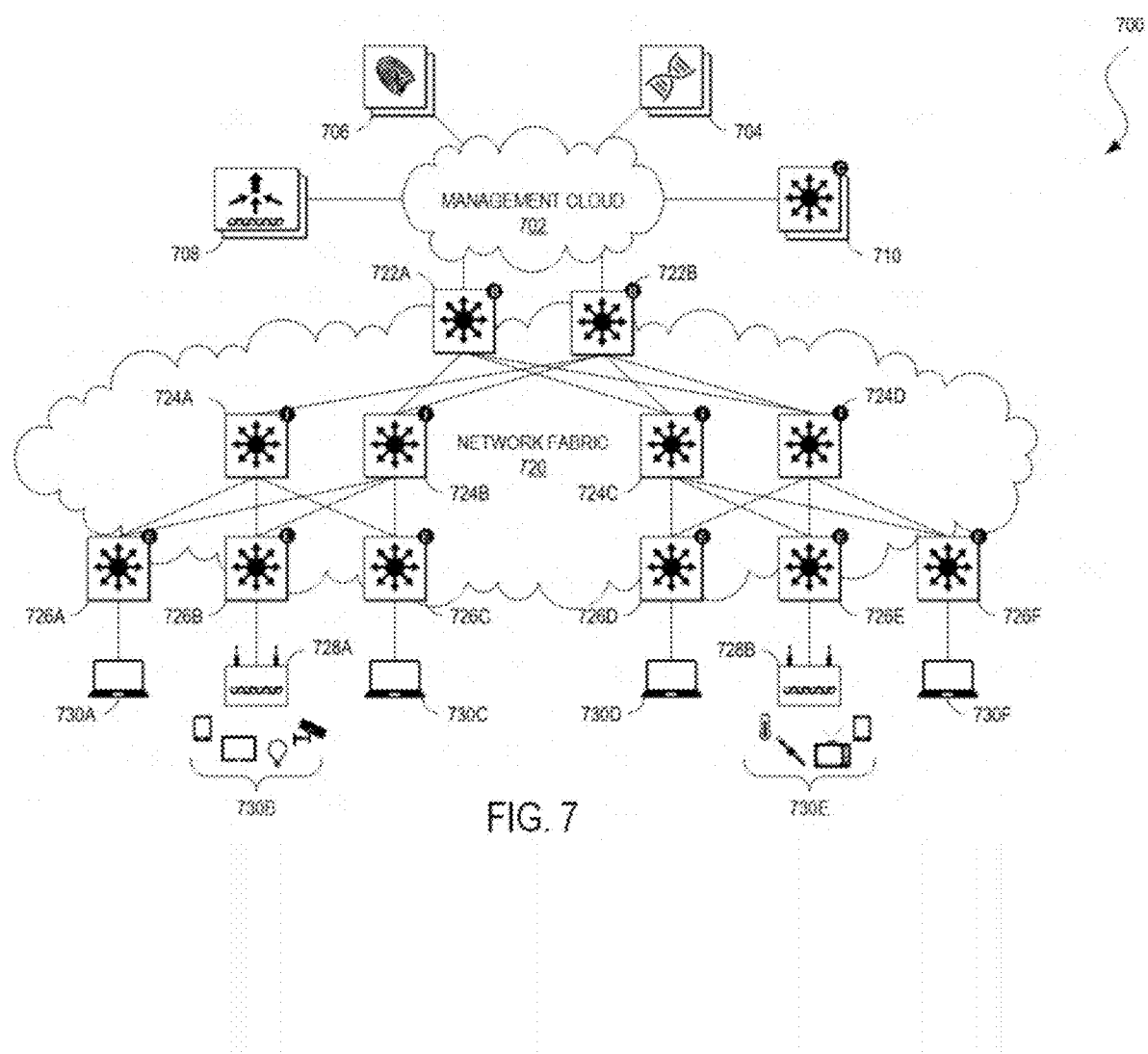
FIG. 7 illustrates an example of a physical topology of an enterprise network in accordance with some embodiments of the present technology.
Figure 8:
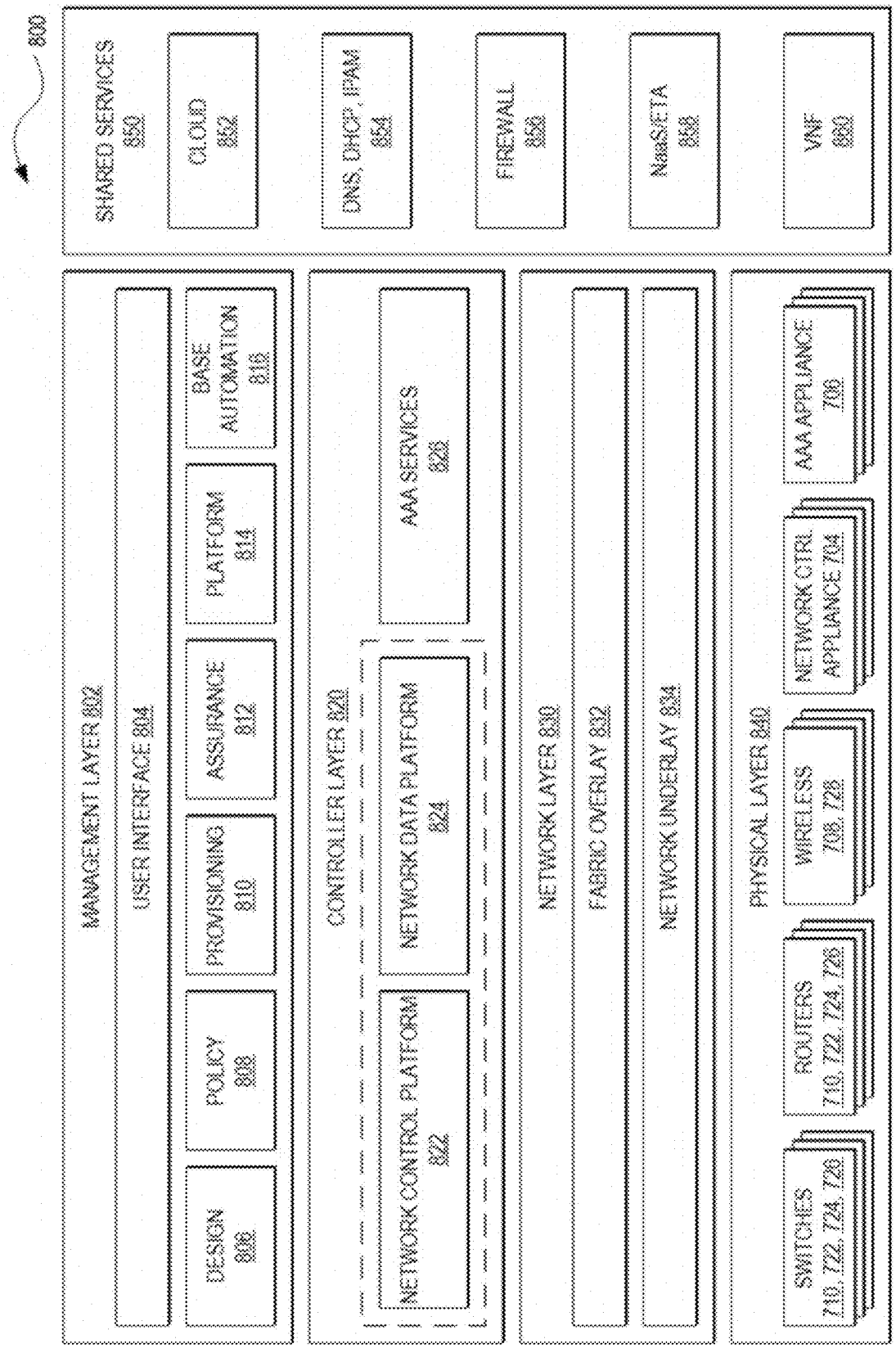
FIG. 8 illustrates an example of a logical architecture for an enterprise network in accordance with some embodiments of the present technology.
Figure 9:
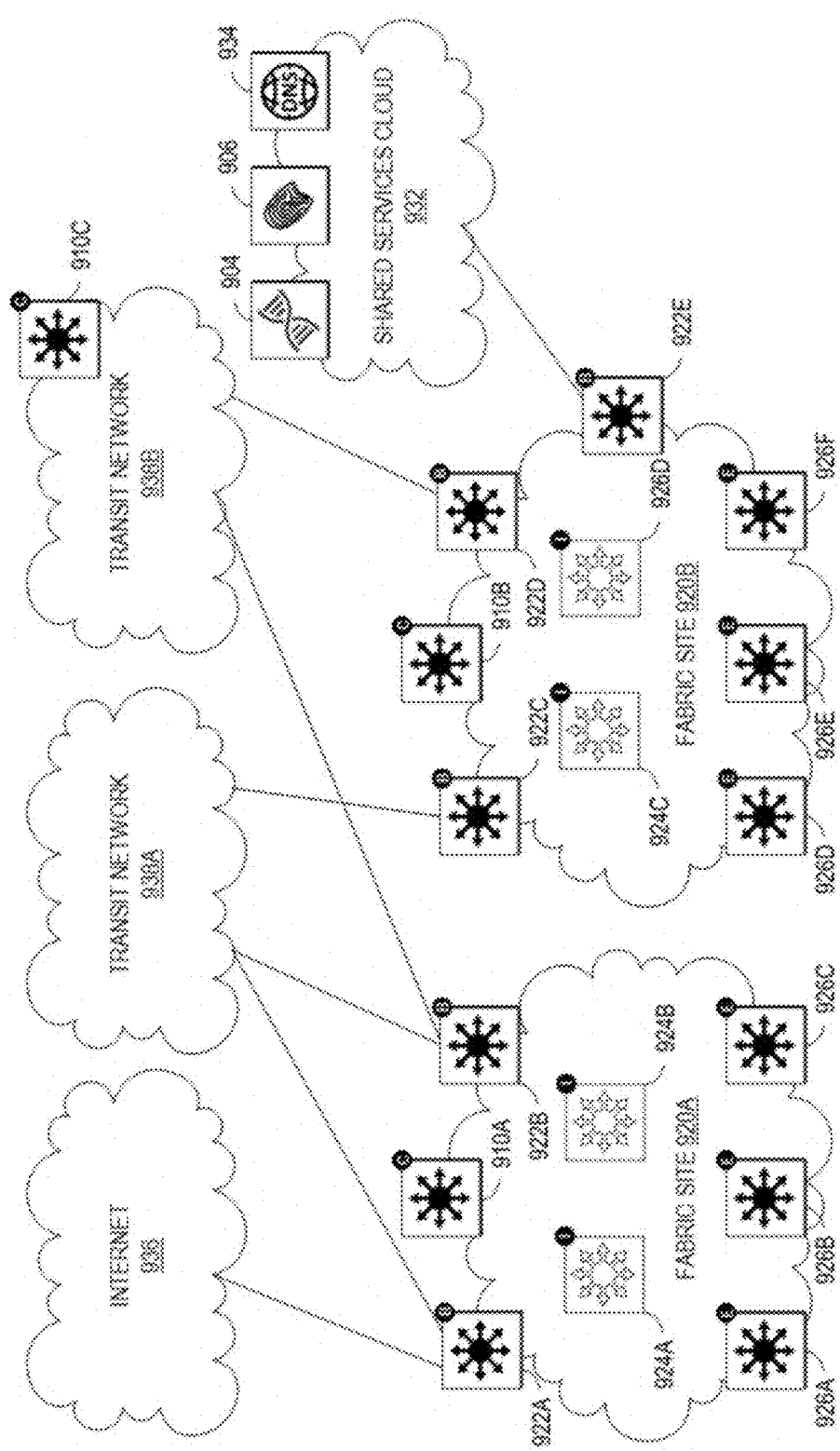
FIG. 9 illustrates an example of a physical topology for a multi-site enterprise network in accordance with some embodiments of the present technology.

The disclosure now turns to FIGS. 7, 8 and 9 to provide a structural and operational description of some aspects of DNA-C.

FIG. 7 illustrates an example of a physical topology of an enterprise network 700 for providing intent-based networking. It should be understood that, for the enterprise network 700 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 700 can include any number or type of resources, which can be accessed and utilized by endpoints or network devices. The illustrations and examples provided herein are for clarity and simplicity.

In this example, the enterprise network 700 includes a management cloud 702 and a network fabric 720. Although shown as an external network or cloud to the network fabric 720 in this example, the management cloud 702 may alternatively or additionally reside on the premises of an organization or in a colocation center (in addition to being hosted by a cloud provider or similar environment). The management cloud 702 can provide a central management plane for building and operating the network fabric 720. The management cloud 702 can be responsible for forwarding configuration and policy distribution, as well as device management and analytics. The management cloud 702 can comprise one or more network controller appliances 704, one or more authentication, authorization, and accounting (AAA) appliances 706, one or more wireless local area network controllers (WLCs) 708, and one or more fabric control plane nodes 710 (Fabric Control plane nodes or fabric controllers in a multi-site fabric example of FIG. 2-5 may be represented by fabric controllers MS1, MS2 and MS3). In other embodiments, one or more elements of the management cloud 702 may be co-located with the network fabric 720.

The network controller appliance(s) 704 can function as the command and control system for one or more network fabrics and can house automated workflows for deploying and managing the network fabric(s). The network controller appliance(s) 704 can include automation, design, policy, provisioning, and assurance capabilities, among others, as discussed further below with respect to FIG. 8. In some embodiments, one or more Cisco Digital Network Architecture (Cisco DNA™) appliances can operate as the network controller appliance(s) 704.

The AAA appliance(s) 706 can control access to computing resources, facilitate enforcement of network policies, audit usage, and provide information necessary to bill for services. The AAA appliance can interact with the network controller appliance(s) 704 and with databases and directories containing information for users, devices, things, policies, billing, and similar information to provide authentication, authorization, and accounting services. In some embodiments, the AAA appliance(s) 706 can utilize Remote Authentication Dial-In User Service (RADIUS) or Diameter to communicate with devices and applications. In some embodiments, one or more Cisco® Identity Services Engine (ISE) appliances can operate as the AAA appliance(s) 706.

The WLC(s) 708 can support fabric-enabled access points attached to the network fabric 720, handling traditional tasks associated with a WLC as well as interactions with the fabric control plane for wireless endpoint registration and roaming. In some embodiments, the network fabric 720 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 708.

The network fabric 720 can comprise fabric border nodes 722A and 722B (collectively, 722), fabric intermediate nodes 724A-D (collectively, 724), and fabric edge nodes 726A-F (collectively, 726). Although the fabric control plane node(s) 710 are shown to be external to the network fabric 720 in this example, in other embodiments, the fabric control plane node(s) 710 may be co-located with the network fabric 720. In embodiments where the fabric control plane node(s) 710 are co-located with the network fabric 720, the fabric control plane node(s) 710 may comprise a dedicated node or set of nodes or the functionality of the fabric control node(s) 710 may be implemented by the fabric border nodes 722. Other examples of fabric border nodes/routers may be provided by BR1 and BR2 in the multi-site fabric example of FIGS. 2-5.

The fabric control plane node(s) 710 can serve as a central database for tracking all users, devices, and things as they attach to the network fabric 720, and as they roam around. The fabric control plane node(s) 710 can allow network infrastructure (e.g., switches, routers, WLCs, etc.) to query the database to determine the locations of users, devices, and things attached to the fabric instead of using a flood and learn mechanism. An example may be provided by reference to FIGS. 2 and 3 wherein fabric edge routers (208 and 210) and fabric border routers (BR1 and BR2) query local fabric control plane nodes/ fabric controllers (MS1, MS2 and/or MS3) for the routing location of one or more external target destinations. In this manner, the fabric control plane node(s) 710 can operate as a single source of truth about where every endpoint attached to the network fabric 720 is located at any point in time. In addition to tracking specific endpoints (e.g., /32 address for IPv4, /728 address for IPv6, etc.), the fabric control plane node(s) 710 can also track larger summarized routers (e.g., IP/mask). This flexibility can help in summarization across fabric sites and improve overall scalability.

The fabric border nodes 722 can connect the network fabric 720 to traditional Layer 3 networks (e.g., non-fabric networks) or to different fabric sites. An example may be provide with reference to FIG. 3, wherein fabric border nodes/routers BR1 and BR2 respectively connect the fabric site 202 to the fabric site 204 and fabric site 204 to the fabric site 206. The fabric border nodes 722 can also translate context (e.g., user, device, or thing mapping and identity) from one fabric site to another fabric site or to a traditional network. When the encapsulation is the same across different fabric sites, the translation of fabric context is generally mapped 1:1. This may also be illustrated with reference to the example multi-site fabric topology of FIG. 3, wherein traffic from fabric site 202 encapsulated in the internet VN 10000 and destined to a target location in the same VN 10000 residing in the Fabric site 206, undergoes a direct 1:1 mapping at fabric border routers BR1 and BR2 as it traverses across fabric sites 202, 204 and 206. The fabric border nodes 722 can also exchange reachability and policy information with fabric control plane nodes of different fabric sites. The fabric border nodes 722 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route). For example, in the multi-site fabric example of FIG. 5, Exit border routers BR3 and BR4 in fabric site 206 may advertise/publish their default external routes (associated with SP1 and SP2) with the local fabric controller MS3 which may, in turn, publish the reachability information to the fabric border router BR2. The fabric border router BR2 may then exchange the reachability and internet access policy information with the fabric controller MS2 residing in fabric site 204. The same process may then be repeated with fabric controller MS2 and fabric border router BR1. The fabric border router BR1 may subsequently exchanges the reachability and internet access policy information with the fabric controller MS1 residing in fabric site 202.

The fabric intermediate nodes 724 can operate as pure Layer 3 forwarders that connect the fabric border nodes 722 to the fabric edge nodes 726 and provide the Layer 3 underlay for fabric overlay traffic.

The fabric edge nodes 726 can connect endpoints to the network fabric 720 and can encapsulate/decapsulate and forward traffic from these endpoints to and from the network fabric. The fabric edge nodes 726 may operate at the perimeter of the network fabric 720 and can be the first points for the attachment of users, devices, and things and the implementation of policy (An example of fabric edge nodes may be provided by routers 208 and 210 in FIGS. 2-4.) In some embodiments, the network fabric 720 can also include fabric extended nodes (not shown) for attaching downstream non-fabric Layer 2 network devices to the network fabric 720 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 726 for communication to outside subnets.

In this example, the network fabric can represent a single fabric site deployment which can be differentiated from a multi-site fabric deployment as discussed further below with respect to FIG. 9.

In some embodiments, all subnets hosted in a fabric site can be provisioned across every fabric edge node 726 in that fabric site. For example, if the subnet 10.10.10.0/24 is provisioned in a given fabric site, this subnet may be defined across all of the fabric edge nodes 726 in that fabric site, and endpoints located in that subnet can be placed on any fabric edge node 726 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 722, 724, and 726.

The enterprise network 700 can also include wired endpoints 730A, 730C, 730D, and 730F and wireless endpoints 730B and 730E (collectively, 730). The wired endpoints 730A, 730C, 730D, and 730F can connect by wire to fabric edge nodes 726A, 726C, 726D, and 726F, respectively, and the wireless endpoints 730B and 730E can connect wirelessly to wireless access points 728B and 728E (collectively, 728), respectively, which in turn can connect by wire to fabric edge nodes 726B and 726E, respectively. In some embodiments, Cisco Aironet® access points, Cisco Meraki® MR access points, and/or other Cisco DNA™-ready access points can operate as the wireless access points 728.

The endpoints 730 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 730 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 720 can support wired and wireless access as part of a single integrated infrastructure such that connectivity, mobility, and policy enforcement behavior are similar or the same for both wired and wireless endpoints. This can bring a unified experience for users, devices, and things that are independent of the access media.

In integrated wired and wireless deployments, control plane integration can be achieved with the WLC(s) 708 notifying the fabric control plane node(s) 710 of joins, roams, and disconnects by the wireless endpoints 730 such that the fabric control plane node(s) can have connectivity information about both wired and wireless endpoints in the network fabric 720, and can serve as the single source of truth for endpoints connected to the network fabric. For data plane integration, the WLC(s) 708 can instruct the fabric wireless access points 728 to form a VXLAN overlay tunnel to their adjacent fabric edge nodes 726. The AP VXLAN tunnel can carry segmentation and policy information to and from the fabric edge nodes 726, allowing connectivity and functionality identical or similar to that of a wired endpoint. When the wireless endpoints 730 join the network fabric 720 via the fabric wireless access points 728, the WLC(s) 708 can onboard the endpoints into the network fabric 720 and inform the fabric control plane node(s) 710 of the endpoints' Media Access Control (MAC) addresses. The WLC(s) 708 can then instruct the fabric wireless access points 728 to form VXLAN overlay tunnels to the adjacent fabric edge nodes 726. Next, the wireless endpoints 730 can obtain IP addresses for themselves via Dynamic Host Configuration Protocol (DHCP). Once that completes, the fabric edge nodes 726 can register the IP addresses of the wireless endpoint 730 to the fabric control plane node(s) 710 to form a mapping between the endpoints' MAC and IP addresses, and traffic to and from the wireless endpoints 730 can begin to flow.

FIG. 8 illustrates an example of a logical architecture 800 for an enterprise network (e.g., the enterprise network 700). One of ordinary skill in the art will understand that, for the logical architecture 800 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 800 includes a management layer 802, a controller layer 820, a network layer 830 (such as embodied by the network fabric 720), a physical layer 840 (such as embodied by the various elements of FIG. 7), and a shared services layer 850.

The management layer 802 can abstract the complexities and dependencies of other layers and provide a user with tools and workflows to manage an enterprise network (e.g., the enterprise network 700). The management layer 802 can include a user interface 804, design functions 806, policy functions 808, provisioning functions 810, assurance functions 812, platform functions 814, and base automation functions 816. The user interface 804 can provide a user with a single point to manage and automate the network. The user interface 804 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or another suitable interface in which the user can configure network infrastructure, devices, and things that are cloud-managed; provide user preferences; specify policies, enter data; review statistics; configure interactions or operations; and so forth. The user interface 804 may also provide visibility information, such as views of a network, network infrastructure, computing devices, and things. For example, the user interface 804 can provide a view of the status or conditions of the network, the operations taking place, services, performance, topology or layout, protocols implemented, running processes, errors, notifications, alerts, network structure, ongoing communications, data analysis, and so forth.

The design functions 806 can include tools and workflows for managing site profiles, maps, and floor plans, network settings, and IP address management, among others. The policy functions 808 can include tools and workflows for defining and managing network policies. The provisioning functions 810 can include tools and workflows for deploying the network. The assurance functions 812 can use machine learning and analytics to provide end-to-end visibility of the network by learning from the network infrastructure, endpoints, and other contextual sources of information. The platform functions 814 can include tools and workflows for integrating the network management system with other technologies. The base automation functions 816 can include tools and workflows to support the policy functions 808, the provisioning functions 810, the assurance functions 812, and the platform functions 814.

In some embodiments, the design functions 806, the policy functions 808, the provisioning functions 810, the assurance functions 812, the platform functions 814, and the base automation functions 816 can be implemented as microservices in which respective software functions are implemented in multiple containers communicating with each rather than amalgamating all tools and workflows into a single software binary. Each of the design functions 806, policy functions 808, provisioning functions 810, assurance functions 812, and platform functions 814 can be viewed as a set of related automation microservices to cover the design, policy authoring, provisioning, assurance, and cross-platform integration phases of the network lifecycle. The base automation functions 814 can support the top-level functions by allowing users to perform certain network-wide tasks.

Returning to FIG. 8, the controller layer 820 can comprise subsystems for the management layer 820 and may include a network control platform 822, a network data platform 824, and AAA services 826. These controller subsystems can form an abstraction layer to hide the complexities and dependencies of managing many network elements and protocols.

The network control platform 822 can provide automation and orchestration services for the network layer 830 and the physical layer 840, and can include the settings, protocols, and tables to automate management of the network and physical layers. For example, the network control platform 830 can provide the design functions 806, the provisioning functions 808 812. In addition, the network control platform 830 can include tools and workflows for discovering switches, routers, wireless controllers, and other network infrastructure devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 822 can communicate with network elements using Network Configuration (NETCONF)/Yet Another Next Generation (YANG), Simple Network Management Protocol
(SNMP), Secure Shell (SSH)/Telnet, and so forth. In some embodiments, the Cisco® Network Control Platform (NCP) can operate as the network control platform 822

The network data platform 824 can provide for network data collection, analytics, and assurance, and may include the settings, protocols, and tables to monitor and analyze network infrastructure and endpoints connected to the network. The network data platform 824 can collect multiple types of information from network infrastructure devices, including Syslog, SNMP, NetFlow, Switched Port Analyzer (SPAN), and streaming telemetry, among others. The network data platform 824 can also collect use contextual information shared from In some embodiments, one or more Cisco DNA™ Center appliances can provide the functionalities of the management layer 810, the network control platform 822, and the network data platform 824. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third-party vendors. The Cisco DNA™ Center appliances can also be cloud-tethered to provide for the upgrade of existing functions and additions of new packages and applications without having to manually download and install them.

The AAA services 826 can provide identity and policy services for the network layer 830 and physical layer 840, and may include the settings, protocols, and tables to support endpoint identification and policy enforcement services. The AAA services 826 can provide tools and workflows to manage virtual networks and security groups and to create group-based policies and contracts. The AAA services 826 can identify and profile network infrastructure devices and endpoints using AAA/RADIUS, 802.1X, MAC Authentication Bypass (MAB), web authentication, and EasyConnect, among others. The AAA services 826 can also collect and use contextual information from the network control platform 822, the network data platform 824, and the shared services 850, among others. In some embodiments, Cisco® ISE can provide the AAA services 826.

The network layer 830 can be conceptualized as a composition of two layers, an underlay 834 comprising physical and virtual network infrastructure (e.g., routers, switches, WLCs, etc.) and a Layer 3 routing protocol for forwarding traffic, and an overlay 832 comprising a virtual topology for logically connecting wired and wireless users, devices, and things and applying services and policies to these entities. Network elements of the underlay 834 can establish connectivity between each other, such as via Internet Protocol (IP). The underlay may use any topology and routing protocol.

In some embodiments, the network controller 704 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 832 can be a logical, virtualized topology built on top of the physical underlay 834, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints. The multi-site fabric example in FIG.

2-5 is based on a LISP overlay fabric control protocol, with map database functionality implemented by MS1, MS2 and MS3.

The fabric policy plane is where intent can be translated into network policy. That is, the policy plane is where the network operator can instantiate logical network policy based on services offered by the network fabric 720, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 720 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 720 defined by a Layer 3 routing domain and can provide both Layer 2 and Layer 3 services (using the VXLAN VNI to provide both Layer 2 and Layer 3 segmentation). For example, with reference to FIG. 3-5, a VN with an instance ID 1, defined within fabric site 202, remains isolated from the internet VN (IID 10000) defined across fabric sites 202, 204 and 206. Micro-segmentation logically separates user or device groups within a VN, by enforcing source to destination access control permissions, such as by using access control lists (ACLs). A scalable group is a logical object identifier assigned to a group of users, devices, or things in the network fabric 720. It can be used as source and destination classifiers in Scalable Group ACLs (SGACLs). The SGT can be used to provide address-agnostic group-based policies.

In some embodiments, the fabric control plane node 710 may implement the Locator/Identifier Separation Protocol (LISP) to communicate with one another and with the management cloud 702. Thus, the control plane nodes may operate a host tracking database, a map server, and a map resolver. The host tracking database can track the endpoints 730 connected to the network fabric 720 and associate the endpoints to the fabric edge nodes 726, thereby decoupling an endpoint's identifier (e.g., IP or MAC address) from its location (e.g., closest router) in the network.

The physical layer 840 can comprise network infrastructure devices, such as switches and routers 710, 722, 724, and 726 and wireless elements 708 and 728 and network appliances, such as the network controller appliance(s) 704, and the AAA appliance(s) 706.

The shared services layer 850 can provide an interface to external network services, such as cloud services 852; Domain Name System (DNS), DHCP, IP Address Management (IPAM), and other network address management services 854; firewall services 856; Network as a Sensor (Naas)/Encrypted Threat Analytics (ETA) services; and Virtual Network Functions (VNFs) 860; among others. The management layer 802 and/or the controller layer 820 can share identity, policy, forwarding information, and so forth via the shared services layer 850 using APIs.

FIG. 9 illustrates an example of a physical topology for a multi-site enterprise network 900. In this example, the network fabric comprises fabric sites 920A and 920B. The fabric site 920A can include a fabric control node 910A, fabric border nodes 922A and 922B, fabric intermediate nodes 924A and 924B (shown here in dashed line and not connected to the fabric border nodes or the fabric edge nodes for simplicity), and fabric edge nodes 926A-D. The fabric site 920B can include a fabric control node 910B, fabric border nodes 922C-E, fabric intermediate nodes 924C and 924D, and fabric edge nodes 926D-F. Another example may be provided by the example multi-site fabric 200 illustrated in FIG. 2. The example multi-site fabric 200 comprises fabric sites 202, 204 and 206. Fabric site 202 may include a fabric control node/fabric controller MS1, fabric border node BR1 and a fabric edge node denoted as 208. Fabric site 204 may include a fabric control node/fabric controller MS2, fabric border nodes BR1 and BR2 and no fabric edge nodes. Fabric site 206 may include a fabric control node/fabric controller MS3, fabric border node BR2, a fabric exit router BR3 and a fabric edge node denoted as 210. Multiple fabric sites corresponding to a single fabric, such as the network fabric of FIG. 9 (and multi-site network fabric 200 of FIG. 2), can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 936, traditional WAN 938A, Software-Defined WAN (SD-WAN) (not shown), or Software-Defined Access (SD-Access) 938B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 720). Another example may be provided with reference to FIG. 2 wherein a local fabric controller MS1/MS3 residing in the fabric site 202/206 registers local endpoints H1/H2 via local edge nodes 208/210. An endpoint that isn't explicitly registered with the local control plane may be assumed to be reachable via border nodes connected to the transit network. For example, referring back to FIG. 2, end point H2 is not explicitly registered with the local fabric controller MS1 residing in fabric site 202. Therefore, if endpoint H1, connected via edge node/router 208 to fabric site 202 tries to contact endpoint H2, connected via edge node/router 210 to fabric site 206, the local fabric controller MS1 of fabric site 202 may return a response corresponding to a routing locator of the fabric border node/router BR1 In some embodiments, the local control plane may not hold state for endpoints attached to other fabric sites such that the border nodes do not register information from the transit network. In this manner, the local control plane can be independent of other fabric sites, thus enhancing the overall scalability of the network.

The control plane in the transit network can hold summary state for all fabric sites that it interconnects. This information can be registered to the transit control plane by a border from different fabric sites. The border nodes can register EID information from the local fabric site into the transit network control plane for summary EIDs only and thus further improve scalability.

The multi-site enterprise network 900 can also include a shared services cloud 932. The shared services cloud 932 can comprise one or more network controller appliances 904, one or more AAA appliances 906, and other shared servers (e.g., DNS; DHCP; IPAM; SNMP and other monitoring tools; NetFlow, Syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.). For example, with reference to the example multi-site fabric network 200 in FIG. 2-5, a common VN, dedicated to internet access traffic, is created (i.e. with an Internet IID 10000 known by fabric controllers MS1, MS2 and MS3) that spans across fabric sites 202, 204 and 206 and provides isolated internet access across the multi-site fabric.

Figure 10:
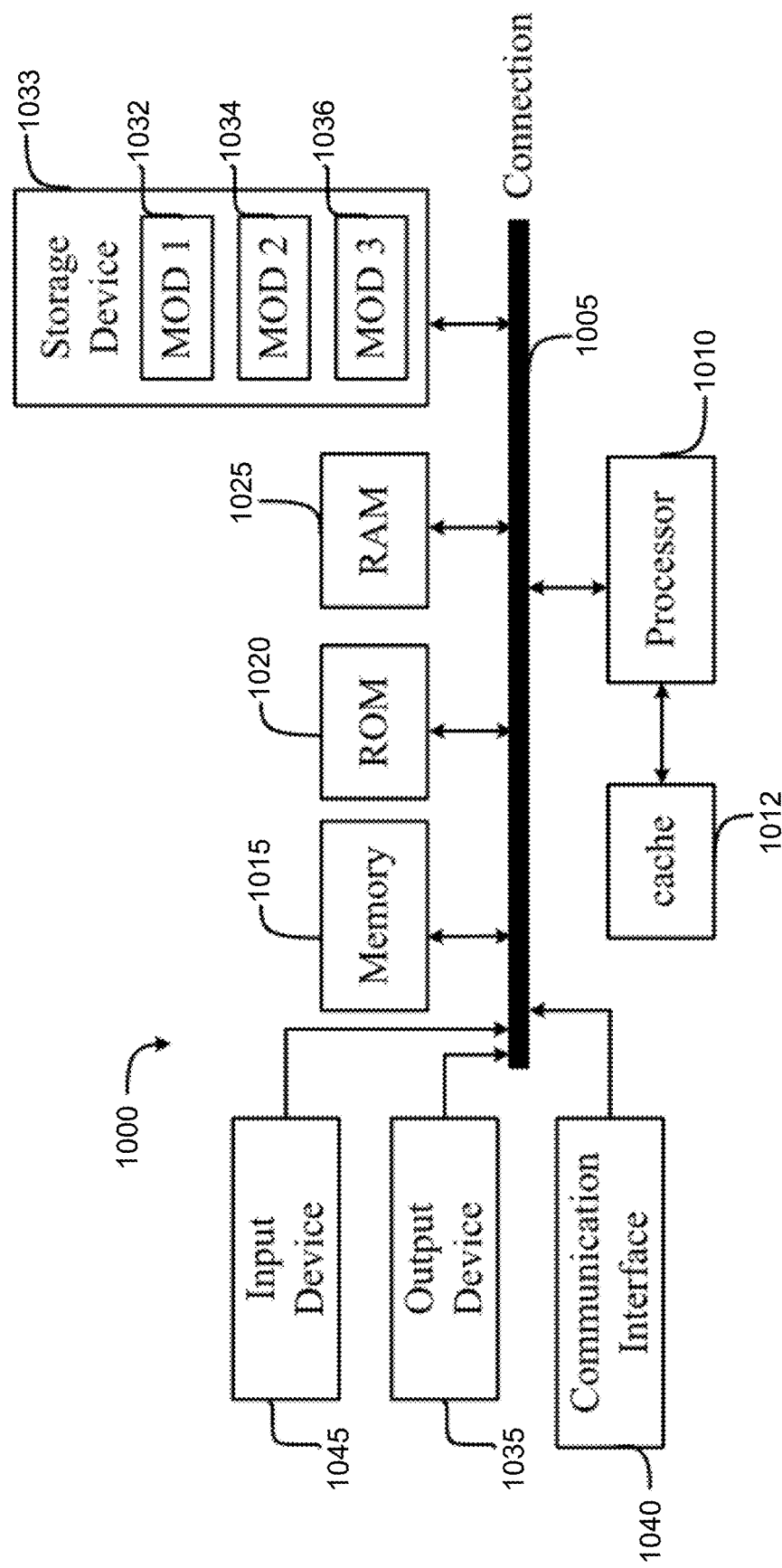
FIG. 10 illustrates an example network device in accordance with some embodiments of the present technology.
Figure 11:
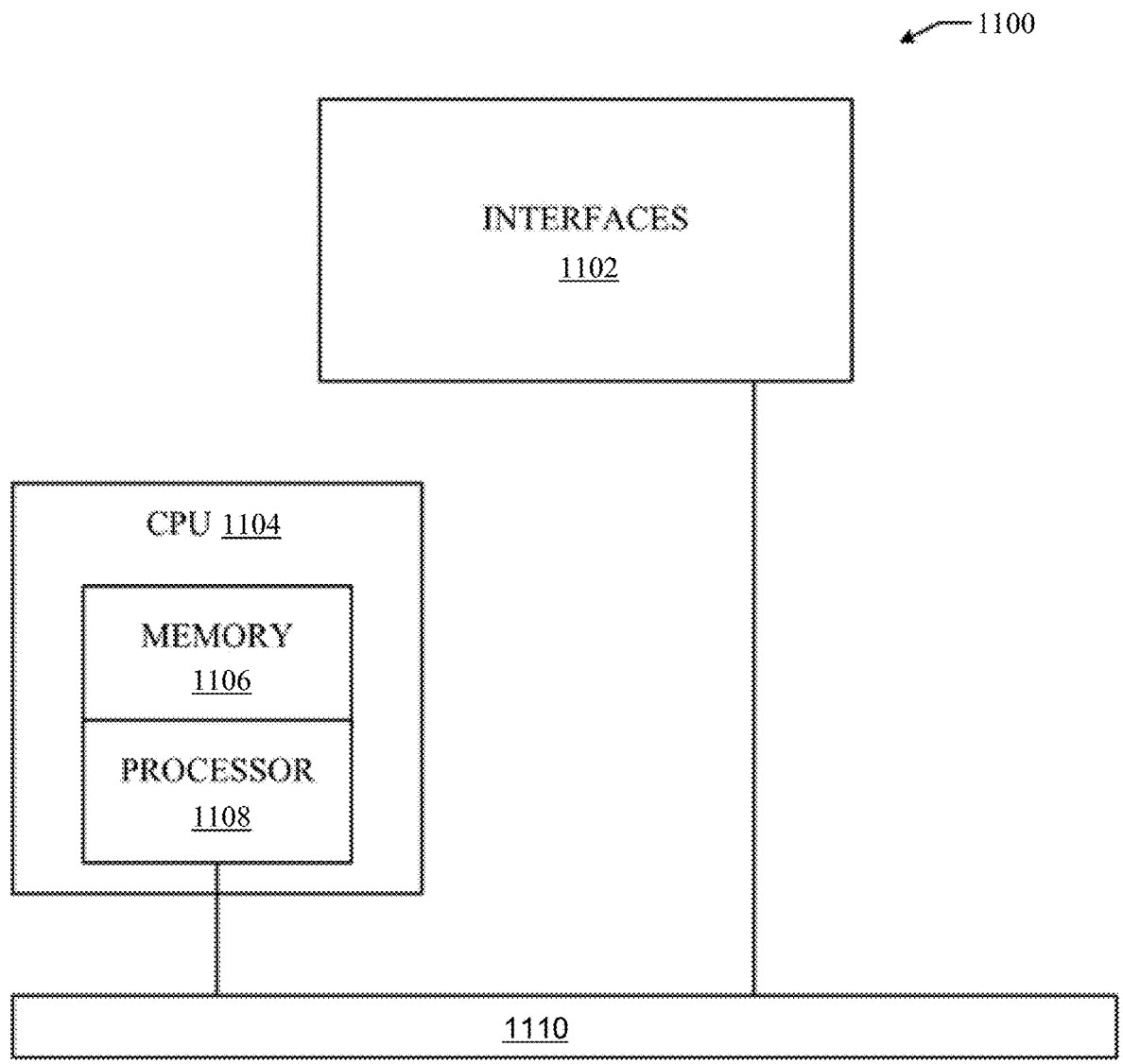
FIG. 11 illustrates an example architecture of a computing device, in accordance with some embodiments of the present technology.

The disclosure now turns to FIGS. 10 and 11, which illustrate example architectures of computing and network devices, such as client computers, switches, routers, controllers, servers, and so forth.

FIG. 10 illustrates a computing system architecture 1000 including components in electrical communication with each other using a connection 1005, such as a bus. System 1000 includes a processing unit (CPU or processor) 1010 and a system connection 1005 that couples various system components including the system memory 1015, such as read-only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read-only memory (ROM) 1020, and hybrids thereof The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

FIG. 11 illustrates an example network device 1100 suitable for performing switching, routing, assurance, and other networking operations. Network device 1100 includes a central processing unit (CPU) 1104, interfaces 1102, and a connection 1110 (e.g., a PCI bus). When acting under the control of appropriate software or firmware, the CPU 1104 is responsible for executing packet management, error detection, and/or routing functions. The CPU 1104 preferably accomplishes all these functions under the control of software including an operating system and any appropriate applications software. CPU 1104 may include one or more processors 1108, such as a processor from the INTEL X106 family of microprocessors. In some cases, processor 1108 can be specially designed hardware for controlling the operations of network device 1100. In some cases, a memory 1106 (e.g., non-volatile RAM, ROM, TCAM, etc.) also forms part of CPU 1104. However, there are many different ways in which memory could be coupled to the system. In some cases, the network device 1100 can include a memory and/or storage hardware, such as TCAM, separate from CPU 1104. Such memory and/or storage hardware can be coupled with the network device 1100 and its components via, for example, connection 1110.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto-processing, and management. By providing separate processors for the communications intensive tasks, these interfaces allow the master microprocessor 1104 to efficiently perform routing computations, network diagnostics, security functions, etc.

Although the system shown in FIG. 11 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 1100.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1106 could also hold various software containers and virtualized execution environments and data.

The network device 1100 can also include an application-specific integrated circuit (ASIC), which can be configured to perform routing, switching, and/or other operations. The ASIC can communicate with other components in the network device 1100 via the connection 1110, to exchange data and signals and coordinate various types of operations by the network device 1100, such as routing, switching, and/or data storage operations, for example.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for providing isolated multi-provider internet access in an overlay fabric comprising:

creating an isolated Internet Virtual Network (VN) in the overlay fabric network, wherein the isolated Internet VN spans across a plurality of domains in the overlay fabric;

leaking into the isolated Internet VN at least one default access route to at least one Service Provider, using one or more local extranet policies;

redirecting at least one traffic flow destined for the at least one Service Provider into the Internet VN in the overlay fabric, using one or more remote extranet policies.

2. The computer-implemented method of claim 1, wherein the at least one default access route to at least one Service provider is leaked into the isolated internet VN at one or more exit points of the overlay fabric.

3. The computer-implemented method of claim 2, wherein the at least one traffic flow in the Internet VN is routed towards the one or more exit points of the overlay fabric using the at least one default access route to the at least one Service Provider.

4. The computer-implemented method of claim 3, wherein the at least one traffic flow in the Internet VN is routed to one or more Service Providers based on one or more internet policy parameters specified at the one or more exit points of the overlay fabric.

5. The computer-implemented method of claim 4, wherein the one or more internet policy parameters comprises a set of priorities and weights assigned to each of the one or more Service Providers.

6. The computer-implemented method of claim 1, wherein the Internet VN is assigned an Internet instance identifier (IID) that is accessible across the plurality of domains in the overlay fabric.

7. The computer-implemented method of claim 1, wherein a prefix of the at least one Service Provider is not exposed in the overlay fabric.

8. The computer-implemented method of claim 1, wherein the at least one default access route to the at least one Service Provider is registered with one or more fabric controllers.

9. The computer-implemented method of claim 8, wherein the one or more fabric controllers publish the at least one default access route to the at least one Service Provider to one or more fabric border routers.

10. A system comprising:
one or more processors; and
at least one computer-readable storage medium having stored therein instructions which, when executed by the one or more processors, cause the one or more processors to:
create an isolated Internet Virtual Network (VN) in an overlay fabric network, wherein the isolated Internet VN spans across a plurality of domains in the overlay fabric network;
leak into the isolated Internet VN at least one default access route to at least one Service Provider, using one or more local extranet policies;
redirect at least one traffic flow destined for the at least one Service Provider into the Internet VN in the overlay fabric, using one or more remote extranet policies.

11. The system of claim 10, wherein the at least one default access route to the at least one Service provider is leaked into the isolated internet VN at one or more exit points of the overlay fabric network.

12. The system of claim 11, wherein the at least one traffic flow in the Internet VN is routed towards the one or more exit points of the overlay fabric network using the at least one default access route to the at least one Service Provider.

13. The system of claim 12, wherein the at least one traffic flow in the Internet VN is routed to the at least one Service Provider based on one or more internet policy parameters specified at the one or more exit points of the overlay fabric.

14. The system of claim 13, wherein the one or more internet policy parameters comprises a set of priorities and weight assigned to each of the one or more Service Providers.

15. The system of claim 10, wherein the Internet VN is assigned an Internet instance identifier (IID) that is accessible across the plurality of domains in the overlay fabric network.

16. The system of claim 10, wherein the at least one default access route to the at least one Service Provider is registered with one or more fabric controllers.

17. The system of claim 16, wherein the one or more fabric controllers publish the at least one default access route to the at least one Service Provider to one or more fabric border routers.

18. At least one non-transitory computer-readable storage medium comprising instructions stored thereon which, when executed by one or more processors, cause the one or more processors to:
create an isolated Internet Virtual Network (VN) in an overlay fabric network, wherein the isolated Internet VN spans across a plurality of domains in the overlay fabric network;
leak into the isolated Internet VN at least one default access route to at least one Service Provider, using one or more local extranet policies;
redirect at least one traffic flow destined for the at least one Service Provider into the Internet VN in the overlay fabric, using one or more remote extranet policies.

19. The non-transitory computer-readable storage medium of claim 18, wherein the at least one default access route to at least one Service provider is leaked into the isolated internet VN at one or more exit points of the overlay fabric network.

20. The non-transitory computer-readable storage medium of claim 19, wherein the at least one traffic flow in the Internet VN is routed towards the one or more exit points of the overlay fabric network using the at least one default access route to the at least one Service Provider.

* * * * *